United States Patent Office 3,404,180
Patented Oct. 1, 1968

3,404,180
MANUFACTURE OF CARBONYL FLUORIDE
Kenneth Lester Cordes, Wilmington, Del., assignor to E. I. du Pont de Nemours and Company, Wilmington, Del., a corporation of Delaware
No Drawing. Filed Dec. 31, 1964, Ser. No. 422,497
2 Claims. (Cl. 260—544)

ABSTRACT OF THE DISCLOSURE

Carbonyl fluoride of high purity can be produced by a process in which $C_2F_4$ and $O_2$ are mixed in stoichiometric proportions and reacted at 200–450° C. in a diluent and heat sink of 10–100 moles of carbonyl fluoride per mole of $O_2$. The reaction is nearly quantitative and produces a product that is about 99% carbonyl fluoride.

---

This invention relates to a novel process for making carbonyl fluoride.

In 1955, Duus, Industrial and Engineering Chemistry, volume 47, page 1445, reported that small amounts, of the order of 12%, of carbonyl fluoride were produced by the combustion of fluorocarbon compounds. In the case of hexafluoropropylene, Duus states that the conversion of hexafluoropropylene to carbonyl fluoride was nearly 90% as the lower flammability limit was approached. The lower flammability limit of the binary system corresponds to an oxygen to hexafluoropropylene molar ratio of about 15⅔:1.

Surprisingly, it has been discovered that tetrafluoroethylene can be reacted with the stoichiometric proportion of oxygen under controlled conditions to yield carbonyl fluoride of about 99% purity.

Accordingly, this invention comprises heating a mixture of substantially equimolar quantities of oxygen and tetrafluoroethylene, together with from about 10 to about 100 moles of carbonyl fluoride per mol of oxygen to a temperature above about 200° C., maintaining the maximum gas temperature between 200° C. and about 450° C., and recovering substantially pure carbonyl fluoride.

In a preferred embodiment of this invention the reaction is performed in a flow system. A mixture of substantially equimolar quantities of oxygen and tetrafluoroethylene together with from 10 to about 100 moles of carbonyl fluoride per mol of oxygen is passed through a reaction zone, the temperature of the mixture in the reaction zone being between 200° C. and 450° C., the residence time of the mixture in the reaction zone being from 1 to 10 seconds and substantially pure carbonyl fluoride is recovered as the exit gas.

The reaction $C_2F_4 + O_2 \rightarrow 2COF_2$ is highly exothermic. From the data of Duus, it can be calculated that the heat evolved is −181.9 Kcals. Ordinarily, heating an equimolar mixture of oxygen and tetrafluoroethylene results in an explosion, and only small amounts of carbonyl fluoride result. It has been discovered if the temperature of reaction is controlled so that it does not rise above about 450° C., carbonyl fluoride is substantially the sole product. It has also been discovered that carbonyl fluoride is itself an effective diluent to control the temperature of the reaction and does not decompose to produce unwanted products. Accordingly, part of the product can be recycled to dilute the reactants. In general, provided the specified conditions are maintained, carbonyl fluoride is produced having a purity of greater than 95%, and generally about 99% purity, without any further treatment.

The amount of carbonyl fluoride required to control the reaction depends on the type of reactor employed, and the temperature of the inlet gases to the reactor. In practice, about 10 to about 100 moles of carbonyl fluoride per mole of oxygen is sufficient to control the temperature within the specified limits.

The measurement of temperature in a gas reaction system is difficult to achieve on an absolute basis. The temperatures referred to hereinabove are the temperature of the gas within the reaction vessel measured by thermocouple.

The reaction of this invention is not sensitive to pressure, and the pressure can be varied over a wide range from subatmospheric pressure to pressures of 10 atmospheres or more. For convenience, it is preferred to perform the reaction at about atmospheric pressure.

The reaction vessel can be constructed of stainless steel, copper, nickel, platinum, or any other material which will withstand the required temperatures and which is chemically inert to the reactants and the products of the reaction. The reaction vessel should be sufficiently large to give a residence time of about 1 to about 10 seconds.

The invention will be better understood by reference to the following specific example which is not, however, intended to delineate fully the scope of this discovery.

EXAMPLE

A reactor was constructed consisting of a stainless steel pipe 2⅜″ in diameter and 25¾″ in length, and having an internal volume of 1.85 liters. Temperature within the reactor was measured by a thermocouple junction located in the center of the pipe. The reactor was provided with an outlet, and a recycle lop including a cooler for the recycle carbonyl fluoride, a blower and a flowmeter. The inlet to the reactor was also provided with metered tetrafluoroethylene and oxygen feeds.

The apparatus was filled with carbonyl fluoride, circulation of carbonyl fluoride was commenced at 21.8 standard liters/minute, and the reactor was preheated to 250° C. The system was then started by feeding tetrafluoroethylene and oxygen each at 1.27 standard liters/minute. The reactor temperature rose to 421° C. and remained at that value during the operation of the system. Infrared analysis showed that the product was 99% $COF_2$ with the balance principally $CF_4$ and $C_2F_4$. A detailed analysis of the product by gas chromatography after 5 hours and 20 minutes of operation gave the following results:

| Product composition: | Mol percent |
|---|---|
| $O_2$ | 0.23 |
| $CF_4$ | 0.08 |
| $CO_2$ [1] | 0.08 |
| $C_2F_4$ | 0.30 |
| $CF_3COF$ | 0.42 |
| $CF_3OCOF$ | 0.53 |
| $COF_2$ (by difference) | 98.36 |

[1] $CO_2$ was not analyzed directly but assumed equal to the $CF_4$ product according to the reaction $C_2F_4 + O_2 = CF_4 + CO_2$.

Conversion for this run was 99.5% based on tetrafluoroethylene and 99.5% based on oxygen. Yield was 98.0% based on tetrafluoroethylene and 98.5% based on oxygen.

I claim:
1. A method for making substantially pure carbonyl fluoride which comprises heating a mixture of equimolar quantities of oxygen and tetrafluoroethylene together with from 10 to 100 moles of carbonyl fluoride per mole of oxygen to a temperature above about 200° C., maintaining the maximum gas temperature between 200° C. and about 450° C., and recovering substantially pure carbonyl fluoride.

2. A method of making substantially pure carbonyl fluoride which comprises passing a mixture of substantially equimolar quantities of oxygen and tetrafluoroethylene together with from 10 to 100 moles of carbonyl fluoride per mol of oxygen through a reaction zone, the temperatures of the said mixture in the said reaction zone being between 200° C. and 450° C., the residence time of the said mixture in the said reaction zone being from 1 to 10 seconds, and recovering substantially pure carbonyl fluoride as the exit gas from the said reaction zone.

References Cited

UNITED STATES PATENTS

| | | | |
|---|---|---|---|
| 2,351,390 | 6/1944 | Benning et al. | 260—653 |
| 2,922,816 | 1/1960 | Bruce | 260—544 |
| 2,927,941 | 3/1960 | Bruce | 260—544 XR |

FOREIGN PATENTS 1,069,137  11/1959  Germany.

LORRAINE A. WEINBERGER, *Primary Examiner.*

J. H. NIELSEN, *Assistant Examiner.*